United States Patent
Huang et al.

(10) Patent No.: US 9,581,882 B2
(45) Date of Patent: Feb. 28, 2017

(54) IMAGE CAPTURING DEVICE AND AUTO-FOCUS METHOD THEREOF

(71) Applicant: Acer Incorporated, New Taipei (TW)

(72) Inventors: Shih-Ting Huang, New Taipei (TW); Chao-Shih Huang, New Taipei (TW)

(73) Assignee: Acer Incorporated, Taipei (TW)

( * ) Notice: Subject to any disclaimer, the term of this patent is extended or adjusted under 35 U.S.C. 154(b) by 0 days.

(21) Appl. No.: 14/737,501

(22) Filed: Jun. 12, 2015

(65) Prior Publication Data

US 2016/0246160 A1 Aug. 25, 2016

(30) Foreign Application Priority Data

Feb. 25, 2015 (TW) .............................. 104106043 A (51) Int. Cl.
*H04N 5/235* (2006.01)
*G03B 13/36* (2006.01)
*H04N 5/232* (2006.01)

(52) U.S. Cl.
CPC ........... *G03B 13/36* (2013.01); *H04N 5/2351* (2013.01); *H04N 5/2353* (2013.01); *H04N 5/23212* (2013.01)

(58) Field of Classification Search
CPC .. H04N 5/232; H04N 5/23212; H04N 5/2257; H04N 5/2351; H04N 5/2353; G03B 13/32; G03B 13/36
See application file for complete search history.

(56) References Cited

U.S. PATENT DOCUMENTS

| | | | |
|---|---|---|---|
| 2003/0160886 A1* | 8/2003 | Misawa | H04N 5/2253 348/347 |
| 2010/0073623 A1* | 3/2010 | Border | G02B 7/08 349/200 |
| 2011/0150446 A1* | 6/2011 | Song | G03B 13/32 396/90 |
| 2012/0154647 A1* | 6/2012 | Endo | H04N 13/0239 348/262 |
| 2013/0002830 A1* | 1/2013 | Pan | G02B 7/36 348/49 |
| 2015/0163394 A1* | 6/2015 | Tsai | H04N 5/23212 348/222.1 |

FOREIGN PATENT DOCUMENTS

| | | |
|---|---|---|
| CN | 103748493 | 4/2014 |
| TW | 201523110 | 6/2015 |
| WO | 2010131725 | 11/2010 |

* cited by examiner

*Primary Examiner* — Abdelaaziz Tissire
(74) *Attorney, Agent, or Firm* — Jianq Chyun IP Office (57) ABSTRACT

An image capturing device and an auto-focus method thereof are provided, where the method includes the following steps. An exposure time is calculated by using an optical sensing element of the first lens. Whether the exposure time exceeds a time threshold is determined. If so, a global maximum search is concurrently performed by the first lens with a first resolution and a first step size as well as by the second lens with a second resolution and a second step size, where the first resolution is higher than the second resolution, and the first step size is less than the second step size. When a focus region in which a focus position is located is obtained by using the second lens, the focus position would be searched out from the focus region by using the first lens so as to obtain a new focus image.

10 Claims, 6 Drawing Sheets

IMAGE CAPTURING DEVICE AND AUTO-FOCUS METHOD THEREOF

CROSS-REFERENCE TO RELATED APPLICATION

This application claims the priority benefit of Taiwan application serial no. 104106043, filed on Feb. 25, 2015. The entirety of the above-mentioned patent application is hereby incorporated by reference herein and made a part of this specification.

BACKGROUND OF THE INVENTION

1. Field of the Invention

The invention generally relates to an image capturing device, in particular, to an image capturing device and an auto-focus method thereof.

2. Description of Related Art

With development in technology, various smart image capturing devices, such as tablet computers, personal digital assistants and smart phones, have become indispensable tools for people nowadays. Camera lenses equipped in high-end smart image capturing devices provide same or better specifications than those of traditional consumer cameras. Some high-end types not only provide specifications such as 10 or more megapixels, large aperture, anti-handshake, and dual lenses, but also provide near-equivalent pixel qualities to those of digital single lens reflex cameras.

In terms of an image capturing device with dual lenses, it may attain a stereo image display by using depth information obtained during image capturing and dynamically adjust a focus region for captured images to provide additional features unavailable in an image capturing device with a single lens. When such dual-lenses image capturing device captures images, it often turns off one of the lenses to become a conventional single-lens image capturing device and performs an auto-focus algorithm according to the clarity of the images captured by the single lens. However, while the single lens is performing auto-focus, the rate for capturing an image per second (i.e. frame per second, fps) in a darker scene would need to be lower due to a longer exposure time and thus cause a slow focus speed.

SUMMARY OF THE INVENTION

Accordingly, the invention is directed to an image capturing device and an auto-focus method thereof, where dual lenses are used for efficiently enhance the focus speed.

The invention is directed to an auto-focus method of an image capturing device, adapted to an image capturing device having a first lens and a second lens. The method includes the following steps. First, an exposure time is calculated by using an optical sensing element of the first lens. Whether the exposure time exceeds a time threshold is determined. If so, a global maximum search is concurrently performed by the first lens with a first resolution and a first step size as well as by the second lens with a second resolution and a second step size, where the first resolution is higher than the second resolution, and the first step size is less than the second step size. When a focus region in which a focus position is located is obtained by using the second lens, the focus position would be obtained within the focus region by using the first lens so as to obtain a new focus image.

The invention is also directed to an image capturing device including a first lens, a second lens, a storage unit, and a processing unit, where the processing unit is coupled to the first lens, the second lens, and the storage unit. The storage unit is configured to record a plurality of modules. The processing unit is configured to access and execute the modules recorded in the storage unit. The modules include a calculating module, a determining module, and a focusing module. The calculating module is configured to calculate an exposure time by using an optical sensing element of the first lens. The determining module is configured to determine whether the exposure time exceeds a time threshold. When the exposure time exceeds the time threshold, the focusing module performs a global maximum search within a focus range concurrently by using the first lens with a first resolution and a first step size in conjunction with the second lens with a second resolution and a second step size, where the first resolution is higher than the second resolution, and the first step size is smaller than the second step size. When the focus module obtains a focus region in which a focus position is located by using the second lens, it further obtains the focus position from the focus region by using the first lens so as to obtain a new focus image.

To sum up, for the image capturing device and the auto-focus method thereof proposed in the invention, when ambient light is detected to be insufficient and results in a longer exposure time, dual lenses are used for efficiently speed up the auto-focus procedure based on their independent auto-focus controllability and image capturing rates so as to greatly enhance user experience.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
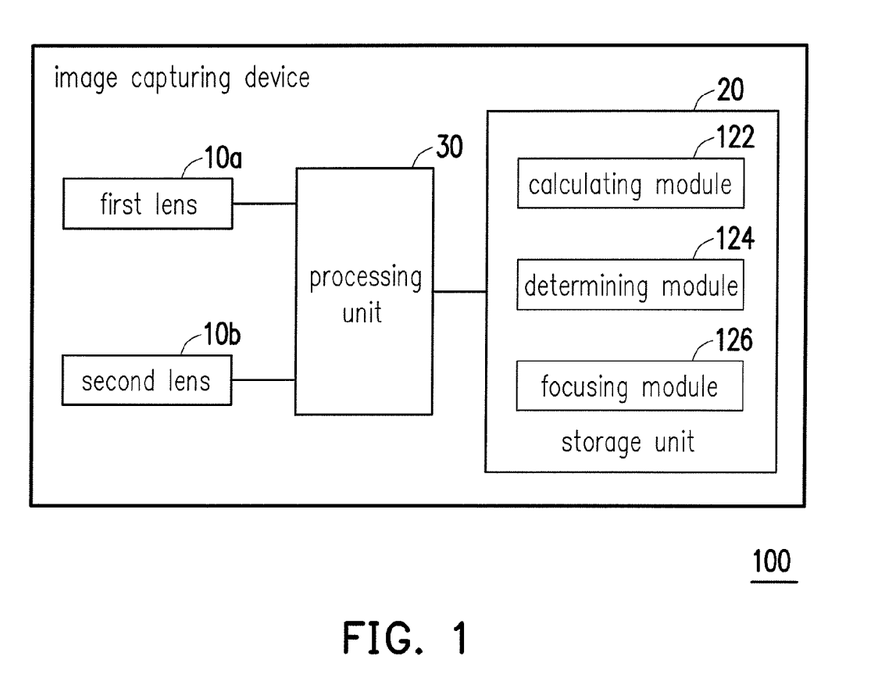
FIG. 1 illustrates a block diagram of an image capturing device according to an embodiment of the invention.

FIG. 1 illustrates a block diagram of an image capturing device according to an embodiment of the invention. It should, however, be noted that this is merely an illustrative example and the invention is not limited in this regard. All components of the image capturing device and their configurations are first introduced in FIG. 1. The detailed functionalities of the components are disclosed along with FIG. 2.

Referring to FIG. 1, an image capturing device 100 includes a first lens 10a, a second lens 10b, a storage unit 20, and one or a plurality of processing units 30. In the present embodiment, the image capturing device 100 is, for example, a digital camera, a digital camcorder, a digital single lens reflex camera or other devices provided with an image capturing feature such as a smart phone, a tablet computer, a personal digital assistant, and so on. The invention is not limited herein.

The first lens 10a and the second lens 10b include optical sensing elements for sensing light intensity entering the first lens 10a and the second lens 10b respectively to thereby generate images. The optical sensing elements are, for example, charge-coupled-device (CCD) elements, complementary metal-oxide semiconductor (CMOS) elements, and yet the invention is not limited thereto. Additionally, specifications of the first lens 10a and the second lens 10b may be the same or different. The invention is not limited herein.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30 for performing the proposed auto-focus method.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 30 is coupled to the first lens 10a, the second lens 10b, and the storage unit 20, and capable of accessing and executing the modules recorded in the storage unit 20 for performing the auto-focus method on the image capturing device 100.

The modules include a calculating module 122, a determining module 124, and a focusing module 126, where the modules may be loaded into the processing unit 30 for performing the proposed auto-focus method. Several embodiments of performing the auto-focus method by the image capturing device 100 will be illustrated in detail hereinafter.

Figure 2:
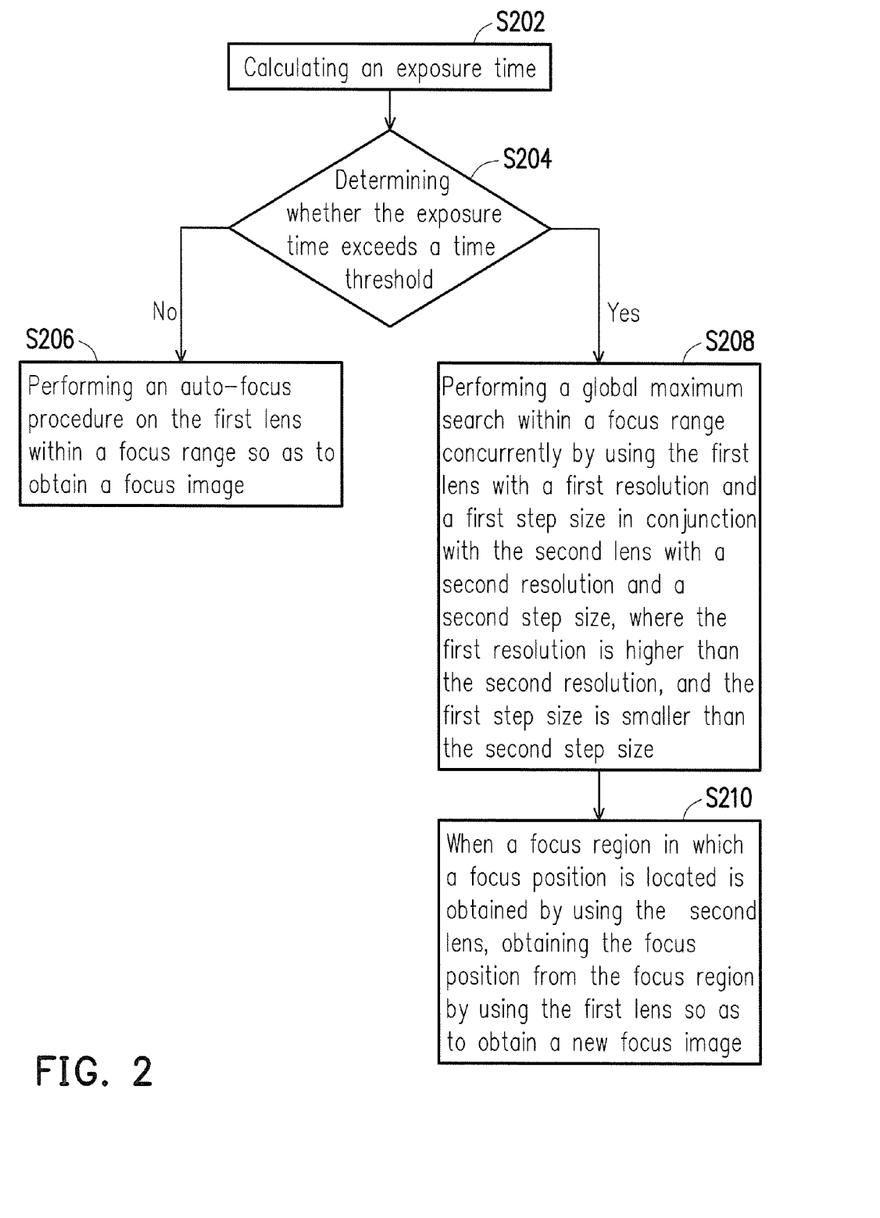
FIG. 2 illustrates a flowchart of an auto-focus method of an image capturing device according to an embodiment of the invention.

FIG. 2 illustrates a flowchart of an auto-focus method of an image capturing device according to an embodiment of the invention, and the auto-focus method of the image capturing device in FIG. 2 may be implemented by the components of the image capturing device 100 in FIG. 1.

Referring to both FIG. 1 and FIG. 2, first, the calculating module 122 calculates an exposure time by using the optical sensing element of the first lens 10a (Step S202). Next, the determining module 124 determines whether the exposure time exceeds a time threshold (Step S204). When the exposure time does not exceed the time threshold, the focusing module 126 performs an auto-focus procedure within a focus range by using the first lens 10a to obtain a focus image (Step S206).

To be specific, when a conventional image capturing device captures an image, it may turn off one of the lenses and becomes a conventional single-lens image capturing device. During an auto-focus procedure, the apparatus would continuously move its lens and calculate the clarity of picture imaging concurrently so as to search for a focus image with maximum clarity (i.e. a maximum focus value). During the search, if the lens requires a less number of steps or a larger step size to move, the focus image would be obtained faster. However, the rate for capturing an image per second (i.e. frame per second, fps) in a darker scene would need to be lower due to a longer exposure time and thus cause a slow focus speed. For example, a frame is considered as a unit during the auto-focus computation, where the number of steps that the lens requires to move for obtaining each frame is one. Assume that the lens needs to move five steps during the auto-focus procedure, and then a focus time with 60 fps is almost one time faster than that with 30 fps.

Accordingly, in the present embodiment, the focusing module 126 may determine the way to perform auto-focus based on the exposure time. When the determining module 124 determines that the exposure time does not exceed the time threshold (i.e. in a scene with sufficient ambient light), the focusing module 126 may perform a conventional auto-focus procedure to obtain the focus image. Such conventional auto-focus procedure may be an auto-focus technique such as hill climbing, and yet the invention is not limited herein.

On the other hand, when the exposure time exceeds the time threshold, the focusing module 126 performs a global maximum search within a focus range concurrently by using the first lens with a first resolution and a first step size in conjunction with the second lens with a second resolution and a second step size, where the first resolution is higher than the second resolution, and the first step size is smaller than the second step size (Step S208). To be specific, when the determining module 124 determines that the exposure time is too long and results in a lower fps, the focusing module 126 may activate the second lens 10b so as to improve an overall auto-focus time by dual lenses.

In an embodiment, assume that the specifications of the first lens 10a and the second lens 10b are the same. The focusing module 126 may lower a lens resolution of the second lens 10b so as to make the lens resolution of the second lens 10b be lower than that of the first lens 10a, and thus the second lens 10b may have a higher fps. As the fps of the second lens 10b becomes higher, the second lens 10b may perform the global maximum search with a larger step size.

In another embodiment, assume that the specifications of the first lens 10a and the second lens 10b are different. Since the first lens 10a has already been set as the main lens for the auto-focus procedure, the lens resolution of the first lens 10a is greater than that of the second lens 10b.

Since the first resolution is greater than the second resolution, the fps of the first lens 10a may be less than that of the second resolution 10b. In other words, the step size of the first lens 10a may be smaller than that of the second lens 10b.

Figure 3:
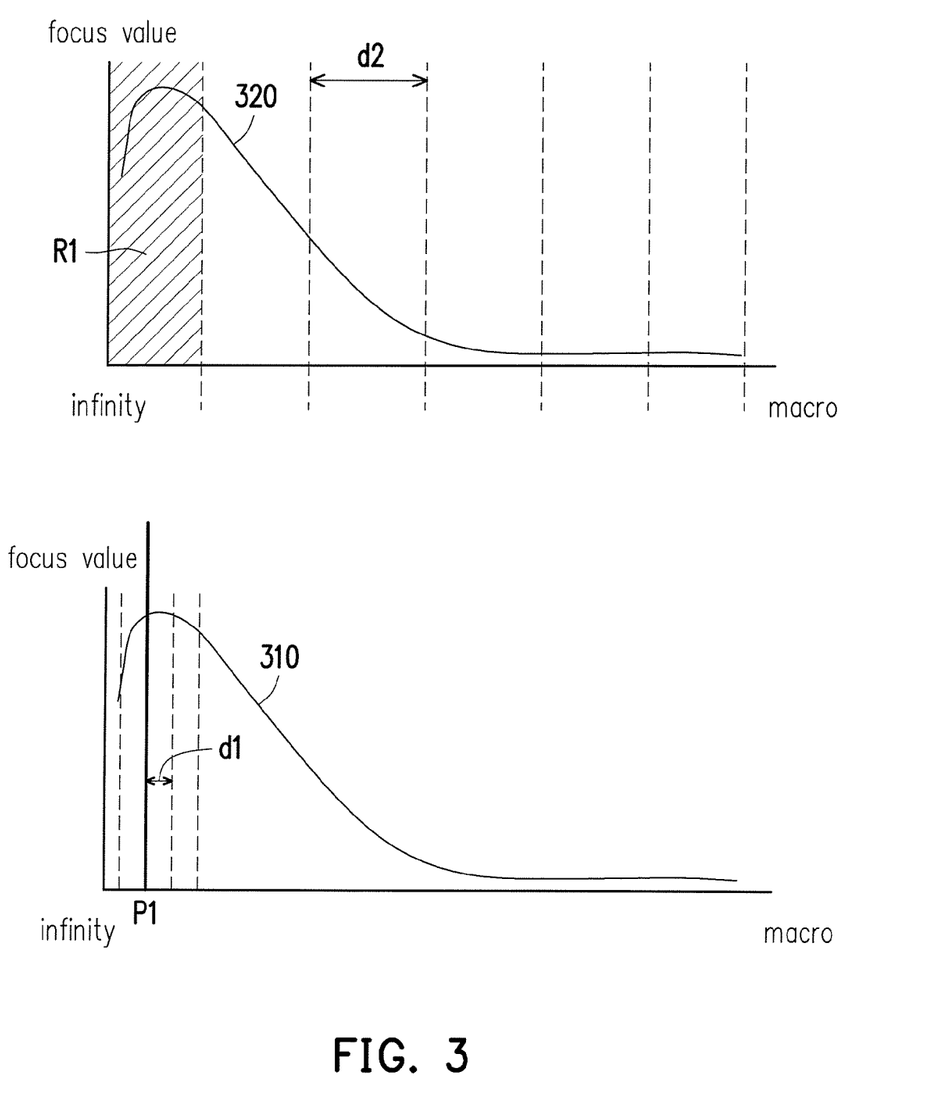
FIG. 3 illustrates a schematic diagram of performing a global maximum search by the first lens and the second lens according to an embodiment of the invention.

For example, FIG. 3 illustrates a schematic diagram of performing a global maximum search by the first lens 10a and the second lens 10b according to an embodiment of the invention.

Referring to FIG. 3, a curve 310 corresponds to the relationship between focus values and focus positions of the first lens 10a, and a curve 320 corresponds to the relationship between focus values and focus positions of the second lens 10b. When the first lens 10a and the second lens 10b are performing a global maximum search, they would move with a step size d1 and a step size d2 respectively, where d2>d1. In other words, the second lens 10b would complete the global search with a faster speed and find out that the maximum focus value is within a region R1 located between Step 0 and Step 1. On the other hand, the first lens 10a would complete the global search with a slower speed and find out that the maximum focus value is at a position P1 corresponding to Step 3, and yet the focus position obtained by the first lens 10a are more precise.

Revisiting FIG. 2, when the focusing module 126 obtains a focus region in which a focus position is located by using the second lens 10b, it would obtain the focus position from the focus region by using the first lens 10a so as to obtain a new focus image (Step S210). As illustrated in the description of FIG. 3, although the second lens 10b completes the global maximum search with a faster speed, it would only find out the region in which the focus position is located due to a larger step size. Hence, after the focus region is obtained by the second lens 10b, the focusing module 126 may control the first lens 10a to search for the maximum focus value within the focus region for a more precise focus position.

An embodiment of performing auto-focus by the first lens 10a and the second lens 10b will be illustrated hereafter. For convenience purposes, the procedure of the global maximum search performed by the second lens 10b is defined as a "fast coarse search", and the procedure of the global maximum search performed by the first lens 10a is defined as a "fine search".

Figure 4:
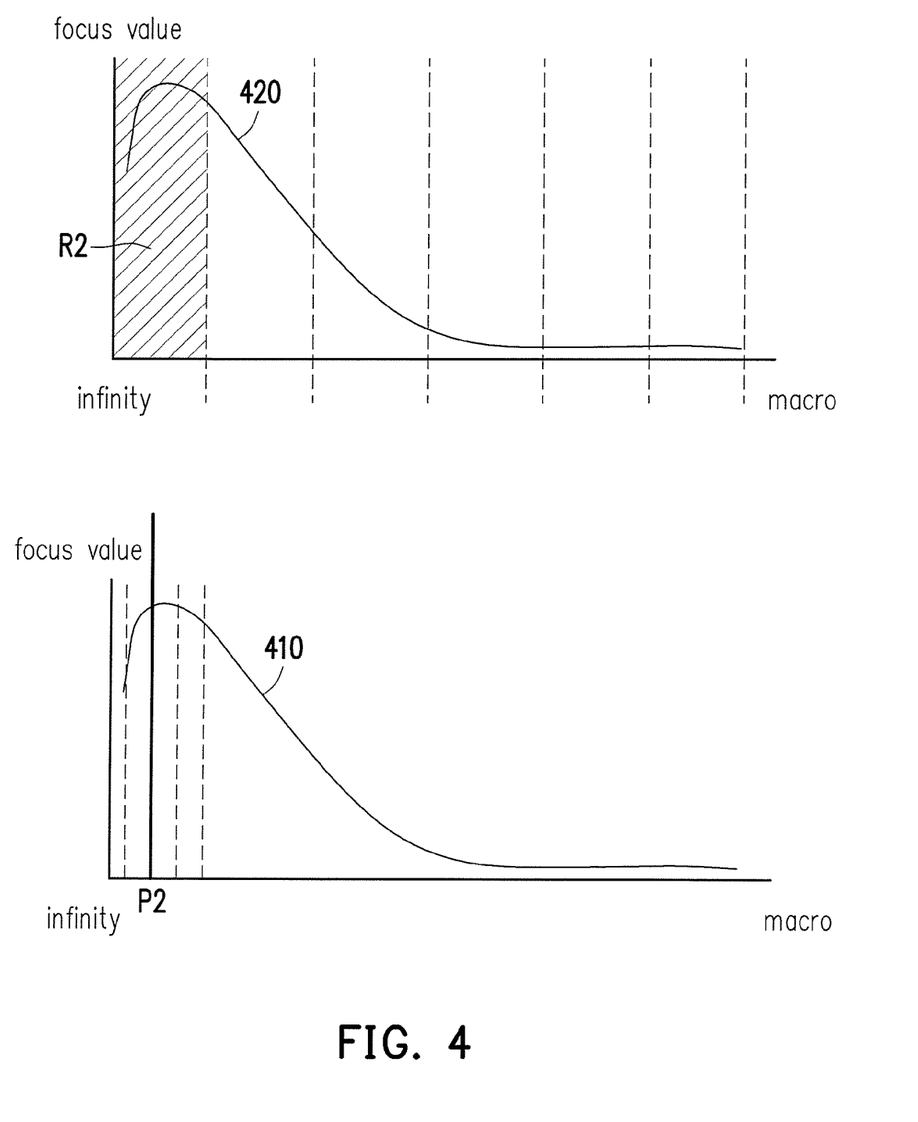
FIG. 4 illustrates a schematic diagram of performing auto-focus respectively by the first lens and the second lens according to an embodiment of the invention.

FIG. 4 illustrates a schematic diagram of performing auto-focus respectively by the first lens 10a and the second lens 10b according to an embodiment of the invention.

Referring to FIG. 4, a curve 410 corresponds to the relationship between focus values and focus positions of the first lens 10a, and a curve 420 corresponds to the relationship between focus values and focus positions of the second lens 10b. In the present embodiment, assume that both of the first lens 10a and the second lens 10b start performing auto-focus from infinity, and a captured scene is a dark scene located at infinity. Assume that the first lens 10a is set to 15 fps, and the second lens 10b is set to 30 fps. Also assume that the second lens 10b searches out a region R2 with a maximum focus value in 6 steps with a total time of 200 ms, and the first lens 10a searches out a focus position P2 with a maximum focus value in 3 steps with a total time of 333 ms.

Since the first lens 10a and the second lens 10b are activated simultaneously, and while the second lens 10b is performing the fast course search, the first lens 10a is concurrently performing the fine search at infinity. When the second lens 10b searches out the region R2 (the focus region), the focusing module 126 would control the first lens 10a to perform the fine search in the region R2 directly. Meanwhile, the first lens 10a has already completed the search within the region R2 and found out that the maximum focus value corresponds to a position P2 where Step 3 is located. In other words, 200 ms of the search time taken by the first lens 10a and the second lens 10b overlaps, and thus it only takes 333 ms in total in the present captured scene. For the conventional auto-focus technique, a single lens performs the fast course search and the fine search subsequently. Assume that such single lens is set to 15 fps, and then 733 ms would be taken. Hence, as compared with the conventional method, the auto-focus method proposed in the present embodiment reduces 400 ms of the focus time, where the efficiency is improved by 54.5%.

Figure 5:
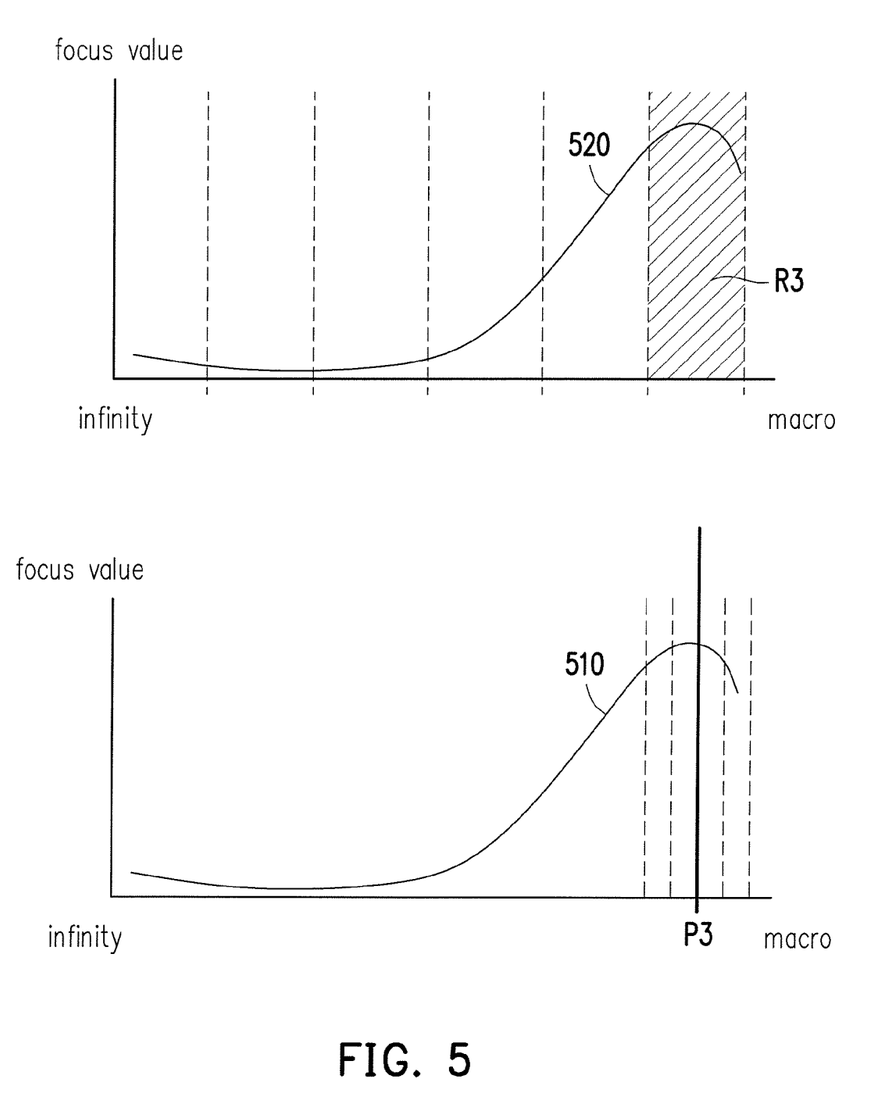
FIG. 5 illustrates a schematic diagram of performing auto-focus respectively by the first lens and the second lens according to another embodiment of the invention.

FIG. 5 illustrates a schematic diagram of performing auto-focus respectively by the first lens 10a and the second lens 10b according to an embodiment of the invention.

Referring to FIG. 5, a curve 510 corresponds to the relationship between focus values and focus positions of the first lens 10a, and a curve 520 corresponds to the relationship between focus values and focus positions of the second lens 10b. In the present embodiment, assume that both of the first lens 10a and the second lens 10b start performing auto-focus from infinity, and a captured scene is a dark scene having an object at a macro distance. Assume that the first lens 10a is set to 15 fps, and the second lens 10b is set to 30 fps. Also assume that the second lens 10b searches out a region R3 with a maximum focus value in 6 steps with a total time of 200 ms, and the first lens 10a searches out a focus position P3 with a maximum focus value in 5 steps with a total time of 333 ms.

Although the first lens 10a and the second lens 10b are activated simultaneously, when the second lens 10b completes the fast course search, the first lens 10a is still performing the fine search at infinity. Meanwhile, the focusing module 126 would control the first lens 10a to move to the region R3 for performing the fine search. Hence, 533 ms would be taken in such captured scene. In terms of the conventional auto-focus technique, assume that a single lens is set to 15 fps, and then 733 ms would be taken. Hence, as compared with the conventional method, the auto-focus method proposed in the present embodiment reduces 200 ms of the focus time, where the efficiency is improved by 27.2%.

Figure 6:
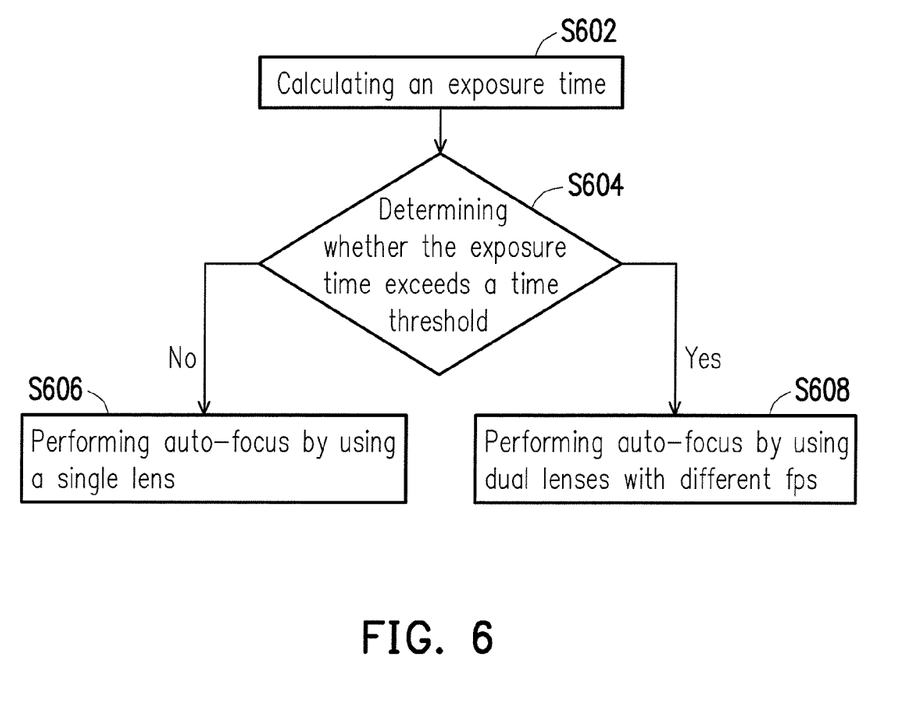
FIG. 6 illustrates a flowchart of an auto-focus method of an image capturing device according to an embodiment of the invention.

The aforesaid auto-focus method of the image capturing device may be summarized by a flowchart as illustrated in FIG. 6 according to an embodiment of the invention.

Referring to FIG. 6, the calculating module 122 calculates an exposure time (Step S602). Next, the determining module 124 determines whether the exposure time exceeds a time threshold (Step S604). When the exposure time does not exceed the time threshold, the focusing module 126 performs the conventional auto-focus method by using a single lens (Step S606). When the exposure time exceeds the time threshold, the focusing module 126 performs the auto-focus method proposed in Step S208 and Step S210 by using dual lenses with different fps (Step S608).

To sum up, for the image capturing device and the auto-focus method thereof proposed in the invention, when ambient light is detected to be insufficient and results in a longer exposure time, dual lenses are used for efficiently speed up the auto-focus procedure based on their independent auto-focus controllability and image capturing rates so as to greatly enhance user experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An auto-focus method of an image capturing device having a first lens and a second lens, comprising:
   calculating an exposure time by using an optical sensing element of the first lens;
   determining whether the exposure time exceeds a time threshold; and
   when the exposure time exceeds the time threshold:
       performing a global maximum search within a focus range concurrently by using the first lens with a first resolution and a first step size in conjunction with the second lens with a second resolution and a second step size, wherein the first resolution is higher than the second
   when a focus region in which a focus position is located is obtained by using the second lens, obtaining the focus position from the focus region by using the first lens so as to obtain a new focus image.

2. The auto-focus method according to claim 1, wherein before the step of performing the global maximum search in the focus range concurrently by using the first lens with the first resolution and the first step size in conjunction with the second lens with the second resolution and the second step size, the auto-focus method further comprises:
activating the second lens;
determining whether a specification of the second lens and that of the first lens are the same; and
if yes, lowering a lens resolution of the second lens so as to make the lens resolution of the second lens be lower than that of the first lens.

3. The auto-focus method according to claim 1, wherein before the step of performing the global maximum search within the focus range concurrently by using the first lens with the first resolution and the first step size in conjunction with the second lens with the second resolution and the second step size, the auto-focus method further comprises:
setting a frame rate of the first lens to be less than that of the second lens, and setting the first lens and the second lens to perform the global maximum search respectively with the first step size and the second step size.

4. The auto-focus method according to claim 1, wherein the step of obtaining the focus position from the focus region by using the first lens so as to obtain the new focus image comprises:
controlling the first lens to move to the focus region so as to search for the focus position within the focus region.

5. The auto-focus method according to claim 1 further comprising:
when the exposure time does not exceed the time threshold, performing an auto-focus procedure on the first lens within the focus range so as to obtain another focus image.

6. An image capturing device comprising:
a first lens;
a second lens;
a storage unit, recording a plurality of modules; and
one or more processing unit, coupled to the first lens, the second lens, and the storage unit, and accessing and performing the module recorded in the storage unit, wherein the modules comprise:

a calculating module, calculating an exposure time by using an optical sensing element of the first lens;
a determining module, determining whether the exposure time exceeds a time threshold; and
a focusing module, wherein when the exposure time exceeds the time threshold, the focusing module performs a global maximum search within a focus range concurrently by using the first lens with a first resolution and a first step size in conjunction with the second lens with a second resolution and a second step size, wherein when obtaining a focus region in which a focus position is located by using the second lens, the focusing module obtains the focus position from the focus region by using the first lens so as to obtain a new focus image, wherein the first resolution is higher than the second resolution, and wherein the first step size is smaller than the second step size.

7. The image capturing device according to claim 6, wherein when the exposure time exceeds the time threshold, the focusing module further activates the second lens, wherein the determining module determines whether a specification of the second lens and that of the first lens are the same, wherein if yes, the focusing module lowers a lens resolution of the second lens so as to make the lens resolution of the second lens be lower than that of the first lens.

8. The image capturing device according to claim 6, wherein the focusing module further sets a frame rate of the first lens to be less than that of the second lens, and sets the first lens and the second lens to perform the global maximum search respectively with the first step size and the second step size.

9. The image capturing device according to claim 6, wherein when the focusing module obtains the focus region in which a focus position is located by using the second lens, the focusing module controls the first lens to move to the focus region so as to search for the focus position within the focus region.

10. The image capturing device according to claim 6, wherein when the exposure time does not exceed the time threshold, the focusing module performs an auto-focus procedure on the first lens within the focus range so as to obtain another focus image.

* * * * *